(12) United States Patent
Nomura

(10) Patent No.: US 7,153,018 B2
(45) Date of Patent: Dec. 26, 2006

(54) ILLUMINATION UNIT AND LIQUID CRYSTAL DISPLAY COMPRISING IT

(75) Inventor: Mitsuo Nomura, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 177 days.

(21) Appl. No.: 10/506,811

(22) PCT Filed: Sep. 19, 2002

(86) PCT No.: PCT/JP02/09593

§ 371 (c)(1),
(2), (4) Date: Sep. 7, 2004

(87) PCT Pub. No.: WO2004/027313

PCT Pub. Date: Apr. 1, 2004

(65) Prior Publication Data

US 2005/0152157 A1    Jul. 14, 2005

(51) Int. Cl.
*G02F 1/1333* (2006.01)
*F21V 7/04* (2006.01)

(52) U.S. Cl. .................. 362/634; 362/561; 362/623; 362/632; 349/58

(58) Field of Classification Search ........ 362/600–634; 349/58, 61
See application file for complete search history.

(56) References Cited

U.S. PATENT DOCUMENTS

| 5,886,759 A | * | 3/1999 | Mashino et al. ............... 349/65 |
| 6,154,262 A | * | 11/2000 | Ogura .......................... 349/61 |
| 6,490,016 B1 | * | 12/2002 | Koura .......................... 349/58 |
| 6,891,580 B1 | * | 5/2005 | Jang et al. .................... 349/58 |
| 7,030,942 B1 | * | 4/2006 | Hong et al. ................... 349/58 |

FOREIGN PATENT DOCUMENTS

| JP | 8-240720 A | 9/1996 |
| JP | 11-224517 A | 8/1999 |

* cited by examiner

*Primary Examiner*—Sandra O'Shea
*Assistant Examiner*—James W Cranson, Jr.
(74) *Attorney, Agent, or Firm*—McDermott Will & Emery LLP

(57) ABSTRACT

A lighting unit comprises a light source, a light guiding plate disposed in the vicinity of the light source for guiding light from the light source, a first reflecting sheet disposed so as to cover a rear surface of the light guiding plate, and a second reflecting sheet disposed so as to cover the light source and the light guiding plate covered with the first reflecting sheet, wherein the first reflecting sheet is interposed and held between the second reflecting sheet and the light guiding plate. The first reflecting sheet may be formed by a single layer or plural layers.

10 Claims, 6 Drawing Sheets

ILLUMINATION UNIT AND LIQUID CRYSTAL DISPLAY COMPRISING IT

TECHNICAL FIELD

The present invention relates both to a lighting unit and to a liquid crystal display device using the same and, more particularly to a thin and small-sized lighting unit and to a liquid crystal display device using the same.

BACKGROUND ART

Recently, a liquid crystal display device has been widely used as a display device of an information device such as a notebook-type personal computer, a word processor and the like, or as a display device of a video device such as a portable television, a video movie, a car navigation system and the like, by taking advantage of a characteristic in which the liquid crystal display device is light and thin, and consumes small electricity. Such liquid crystal display device typically has a structure in which a display element is illuminated from behind by a built-in lighting unit for obtaining a bright display screen.

As a lighting unit, there is an edge light type lighting unit in which a linear light source such as a fluorescent discharge tube is disposed on an end face of a light guiding plate disposed on a rear surface of the display element (an opposite surface of a display surface of the element). The edge light type is characterized in that a thin lighting unit and a highly uniform luminance of a light emitting surface thereof can be obtained. Therefore, in order to give priority to thinness of the lighting unit, the edge light type is commonly adopted in the lighting unit used as a back light of the liquid crystal display device composing the notebook-type personal computer and the like. In the edge light type, however, there is a proportional relationship between thickness of the entire lighting unit and the luminance thereof. So, when the luminance has priority over the thinness, the thickness increases, while when the thinness has priority over the luminance, the luminance decreases. Thus, the thinness and the luminance have a trade-off relationship, and therefore, it is necessary to solve this essential problem in order for the thinness and the luminance to be compatible with each other. Accordingly, in the liquid crystal display device used in the video movie, the car navigation system and the like, for example, the lighting unit of the edge light type in which two or more fluorescent discharge tubes are provided, or that of the edge light type in which an L-shaped or U-shaped fluorescent discharge tube is disposed along the end face of the light guiding plate is used to allow the thinness and the luminance to be compatible with each other. However, since the liquid crystal display is required to provide improved portability and to save a space, it is desirable to further reduce the thickness of the entire lighting unit while maintaining the luminance thereof.

On the other hand, when the lighting unit is operating, a high-frequency alternating current of 40 to 100 kHz is generally applied to the fluorescent discharge tube. Thereby, the fluorescent discharge tube is driven to emit light. Herein, the fluorescent discharge tube to which such high voltage is applied generates an electromagnetic wave while emitting light. It is highly possible that the electromagnetic wave radiated from the fluorescent discharge tube affects a liquid crystal display element and a circuit board disposed on a rear surface side of the lighting unit, thereby causing a display defect such as occurrence of noise or Moire fringes on a display screen. Therefore, in general, an electrical conductor such as metal covers a periphery of the fluorescent discharge tube to shield the tube.

FIG. 5 is a cross-sectional view schematically showing a structure of the liquid crystal display device comprising the lighting unit of the conventional edge light type. A liquid crystal display device LD comprises a lighting unit UT configured to illuminate a liquid crystal panel 6 from behind. The lighting unit UT comprises a light guiding plate 1 for guiding light emitted from a fluorescent discharge tube 2 to the liquid crystal panel 6, fluorescent discharge tubes 2 as light sources disposed on end faces of the light guiding plate 1, a reflecting sheet 3, and electrically conductive sheets 5. The liquid crystal panel 6 is disposed on a light emanating surface side of the lighting unit UT, while a circuit board 8 provided with a drive circuit of the lighting unit UT and the liquid crystal panel 6 is disposed on the rear surface side thereof.

Light leaking out of a bottom surface and the end faces of the light guiding plate 1 is reflected by the reflecting sheet 3 and is returned into the light guiding plate 1, thereby enabling an amount of light emitted from the light emanating surface of the light guiding plate 1 to increase. As the reflecting sheet 3, a white resinous film having a high reflectivity is used, for example. The reflecting sheet 3 is disposed so as to cover the entire bottom surface of the light guiding plate 1, and is bent in U-shape so as to enclose each of end face regions of the light guiding plate 1 and each of the fluorescent discharge tubes 2. As used herein, reflector portions RF refer to portions including the end face regions of the light guiding plate 1 and the fluorescent discharge tubes 2. The reflecting sheet 3 is bonded and fixed to the bottom surface of the light guiding plate 1 by an adhesive (not shown) such as a double face adhesive tape, and is also bonded to a front surface of the light guiding plate 1 corresponding to the reflector portion RF by an adhesive 7a. The reflecting sheet 3 may be provided with, for example, a printed pattern on a surface thereof for promoting diffusion of light as it is distant from the fluorescent discharge tube 2.

Herein, a case where the reflecting sheet 3 continuously covering the reflector portions RF and the bottom surface of the light guiding plate 1 is used is described with reference to FIG. 5. As an alternative example of the reflecting sheet 3, as shown in FIG. 6, the sheet may be structured such that sheets 3a covering the reflector portions RF and a sheet 3b covering the bottom surface of the light guiding plate 1 are provided separately, and are bonded to each other by an adhesive 7b such as the double face adhesive tape. By using the integral-type reflecting sheet 3 as shown in FIG. 5, a thin lighting unit UT, a cost reduction thereof, and a reduction of the number of assembly processes thereof are favorably realized.

As shown in FIG. 5, in order to inhibit the electromagnetic wave radiated from the fluorescent discharge tube 2 when emitting light from adversely affecting the liquid crystal panel 6 or the circuit board 8, the electrically conductive sheet 5 as an electromagnetic wave blocking component is disposed on the surface of the reflecting sheet 3 corresponding to the reflector portion RF such that the electrically conductive sheet 5 is bent in U-shape so as to enclose the reflector portions RF. The electrically conductive sheet 5 is a sheet made of an electrically conductive material such as copper foil or aluminum foil, and is bonded to the surface of the reflecting sheet 3 of the reflector portions RF by means of an adhesive applied to the surface of the sheet 5.

In the lighting unit UT and the liquid crystal display device LD thus structured, thermal expansion coefficients and water absorption coefficients of the light guiding plate 1 and the reflecting sheet 3 differ from each other. Therefore, when the light guiding plate 1 and the reflecting sheet 3 expand or contract due to a variation in humidity and temperature in the vicinity of the lighting unit UT, a difference occurs between an amount of expansion or contraction of the light guiding plate 1 and that of the reflecting sheet 3, due to a difference in the thermal expansion coefficient or the water absorption coefficient between the plate 1 and the sheet 3. Since the reflecting sheet 3 is bonded to the bottom surface of the light guiding plate 1 by the adhesive as described above, there is a possibility that deflection occurs in the reflecting sheet 3, when the difference occurs between the amount of expansion or contraction of the reflecting sheet 3 and that of the light guiding plate 1. Since the deflection of the reflecting sheet 3 is reflected in the light emitting surface of the lighting unit UT as non-uniform luminance, there is a possibility that this negatively affects uniformity of the illuminating light of the lighting unit UT.

Also, in the above-described structure, since the thermal expansion coefficients and the water absorption coefficients of the reflecting sheet 3 and the electrically conductive sheet 5 differ from each other, a difference occurs between the amount of expansion or contraction of the reflecting sheet 3 and that of the electrically conductive sheet 5, due to a difference in the thermal expansion coefficient and the absorption coefficient between the sheet 3 and the sheet 5, as in the case of the light guiding plate 1 and the reflecting sheet 3. Since the electrically conductive sheet 5 is bonded and fixed to the surface of the reflecting sheet 3 corresponding to the reflector portion RF by the adhesive as described above, there is a possibility that deflection or crease occurs in the reflecting sheet 3 corresponding to the reflector portion RF to which the electrically conductive sheet 5 is bonded, when the difference occurs between the amount of expansion or contraction of the reflecting sheet 3 and that of the electrically conductive sheet 5. Since deflection or crease of the reflecting sheet 3 is reflected in the light emitting surface of the lighting unit UT as the non-uniform luminance, there is a possibility that these negatively affect the uniformity of the illuminating light of the lighting unit UT.

Especially, in a region K1 on the rear surface side of the light guiding plate 1 corresponding to the reflector portion RF, occurrence of slight deflection or crease makes the luminance vary locally in a region with the deflection or the crease, thereby causing the luminance of the region to increase drastically. As a result, the non-uniform luminance is increased. If the electrically conductive sheet 5 is not disposed in the region K1, then occurrence of deflection or crease of the reflecting sheet 3 are inhibited. But in this case, the electromagnetic wave radiated from the fluorescent discharge tube 2 reaches the circuit board 8 and the like through the region K1, and adversely affects them. Therefore, it is necessary to dispose the electrically conductive sheet 5 in the region K1. On the other hand, in a region K2 on the front surface side of the light guiding plate 1 corresponding to the reflector portion RF, since the reflecting sheet 3 is bonded and fixed to the light guiding plate 1 by the adhesive 7a, deflection or crease hardly occurs in the reflecting sheet 3. And, in a region on the end face side of the light guiding plate 1 corresponding to the reflector portion RF, since the reflecting sheet 3 is disposed outside of the light guiding plate 1, the influence on uniform luminance of the light emitting surface of the lighting unit UT is not large even if deflection or crease occurs in the reflecting sheet 3.

Besides occurrence of the above-described non-uniform luminance, there is also a problem that heat of the fluorescent discharge tube 2 is deprived by the electrically conductive sheet 5 when the sheet 5 is disposed on the reflector portion RF. So, luminance rising characteristic of the lighting unit UT is deteriorated when the lighting unit UT starts to be lighted under low-temperature environment, as compared to the case where the sheet 5 is not disposed.

In the meantime, such non-uniform luminance due to deflection or crease of the reflecting sheet 3 is considered to be solved by forming the entire or a part of the reflecting sheet 3 by a solid material such as a metal plate having a reflective surface. However, when the reflecting sheet 3 is comprised of the metal plate, thickness and weight thereof increase, thereby increasing thickness and weight of the entire lighting unit UT as compared to the above-described reflecting sheet 3 comprised of the resinous film. Furthermore, a cost of the sheet also disadvantageously increases. In order to inhibit occurrence of deflection or crease of the reflecting sheet 3 in the region K1 on the rear surface side of the light guiding plate 1 corresponding to the reflector portion RF, it is conceived that the light guiding plate 1 and the reflecting sheet 3 are bonded to each other by an adhesive such as the double face adhesive tape, as in the case of the region K2. In this case, however, the luminance in the region K1 extremely increases due to reflection by the adhesive, thereby causing the non-uniform luminance to adversely occur.

DISCLOSURE OF THE INVENTION

An object of the present invention is to provide a thin, low-cost and highly reliable lighting unit capable of inhibiting occurrence of non-uniform luminance due to deflection or crease in a reflecting sheet, and a liquid crystal display device using the same.

In order to achieve the above object, according to the present invention, there is provided a lighting unit comprising a light source, a light guiding component for guiding light emitted from the light source to an object to be illuminated, and a reflecting component configured to cover the light guiding component, wherein the reflecting component comprises a reflecting sheet configured to cover a surface of the light guiding component, and a hold sheet for holding the reflecting sheet which is configured to cover the light guiding component covered with the reflecting sheet and to hold the reflecting sheet, and the reflecting sheet is interposed and held between the light guiding component and the hold sheet for holding the reflecting sheet such that the reflecting sheet is not fixed to the light guiding component and the hold sheet for holding the reflecting sheet.

In such a configuration, since thermal expansion coefficients and water absorption coefficients of the reflecting sheet and the light guiding component made of different materials differ from each other, a difference occurs in an amount of expansion or contraction between these components, when these components expand or contract due to a variation in temperature and humidity in the vicinity of the lighting unit. But, in this configuration, since the reflecting sheet is not fixed to the light guiding component, and to the hold sheet for holding the reflecting sheet, the reflecting sheet is not subjected to tensile stress or compressive stress from the light guiding component and the hold sheet, and the reflecting sheet expands or contracts freely, even if the amount of expansion or contraction differs from that of the light guiding component, as described above. Therefore, deflection or crease due to expansion or contraction does not occur in the reflecting sheet. As a result, it becomes possible to obtain uniform light by inhibiting the non-uniform luminance due to deflection or crease in the reflecting sheet.

At least a portion of the hold sheet for holding the reflecting sheet may be fixed to the light guiding component, for example, to a surface of the light guiding component.

In such a configuration, as described above, since deflection or crease does not occur in the reflecting sheet which contacts the light guiding component, even if deflection or crease occurs in the hold sheet for holding the reflecting sheet which is fixed to the light guiding component, occurrence of the non-uniform luminance is inhibited. Therefore, an effect of the present invention is effectively achieved.

The hold sheet for holding the reflecting sheet may be formed by a reflecting sheet.

In such a configuration, since the reflecting sheets are superposed on a rear surface of the light guiding component, it becomes possible to reflect light leaking out of the unit more efficiently and to guide it into the light guiding component. So, it becomes possible to increase an amount of light emanating from a light emanating surface and to improve the luminance thereof. Furthermore, a small unit and a cost reduction thereof are achieved.

An electrically conductive sheet may be disposed on a region of the hold sheet for holding the reflecting sheet which is configured to cover the light source, and configured to block an electromagnetic wave radiated from the light source.

In such a configuration, the electromagnetic wave radiated from the light source can be blocked by the electrically conductive sheet. When such lighting unit is used in the liquid crystal display device, for example, the electromagnetic wave can be inhibited from negatively affecting a liquid crystal panel as the object to be illuminated, a drive circuit for driving the lighting unit and the liquid crystal panel or the like. As a result, it becomes possible to inhibit a display defect such as occurrence of noise or Moire fringes, and to thereby obtain a high reliable liquid crystal display device.

Herein, since thermal expansion coefficients and water absorption coefficients of the hold sheet for holding the reflecting sheet and the electrically conductive sheet made of different materials differ from each other, a difference occurs in amount of expansion or contraction between these components, when these components expand or contract due to a variation in temperature and humidity in the vicinity of the lighting unit. And, due to the difference in the amount of expansion or contraction, the hold sheet for holding the reflecting sheet is subjected to tensile stress or compressive stress from the electrically conductive sheet when the hold sheet expands or contracts, and, deflection or crease occurs in the hold sheet. However, in such a configuration, since the reflecting sheet is disposed between the hold sheet for holding the reflecting sheet and the light guiding component, separately from the electrically conductive sheet, deflection or crease does not occur in the reflecting sheet, even if deflection or crease occurs in the hold sheet, as described above. So, the uniform light can be obtained by inhibiting occurrence of the non-uniform luminance.

And, since the reflecting component comprises the reflecting sheet and the hold sheet for holding the reflecting sheet, transmission of heat from the light source to the electrically conductive sheet can be inhibited, as compared to the case where this is formed only by the reflecting sheet. As a result, it becomes possible to improve the luminance rising characteristic when the lighting unit starts to be lighted under low-temperature environment. Especially, when the reflecting sheet made of a material having a thermal conductivity coefficient lower than that of the hold sheet for holding the reflecting sheet is disposed, transmission of heat to the electrically conductive sheet can be inhibited more effectively. Therefore, the luminance rising characteristic under low-temperature environment is further improved.

The light guiding component may be a light guiding plate, the light source may be disposed along an end face of the light guiding plate, the reflecting sheet may cover at least a rear surface of the light guiding plate, the hold sheet for holding the reflecting sheet may cover the rear surface of the light guiding plate covered with the reflecting sheet, the light source, and the end face of the light guiding plate, and the electrically conductive sheet may be disposed on a surface of the hold sheet for holding the reflecting sheet.

In such a configuration, a thin, small, light, and low-cost edge light type lighting unit capable of blocking the electromagnetic wave and achieving high and uniform luminance is realized.

The liquid crystal display device according to the present invention comprises the above-described lighting unit, a liquid crystal panel disposed on the light emanating surface side of the lighting unit, and a drive unit for driving the lighting unit and the liquid crystal panel.

In such a configuration, since the above-described effect is achieved in the lighting unit, it is possible to obtain a thin, light, and low-cost liquid crystal display device capable of achieving uniform and highly luminous light thereof by inhibiting occurrence of the non-uniform luminance.

The above-described liquid crystal display device is preferably provided with the lighting unit where the electrically conductive sheet is disposed.

In such a configuration, the above-described electromagnetic wave blocking effect is obtained in the lighting unit provided with the electrically conductive sheet. Therefore, it is possible to inhibit the electromagnetic wave from negatively affecting the liquid crystal panel, the drive circuit or the like, and therefore to obtain a highly reliable liquid crystal display device by inhibiting occurrence of defect such as noise or Moire fringes.

The object, as well as other objects, features and advantages of the present invention will become more apparent from the following detailed description of the preferred embodiments taken with reference to the accompanying drawings.

BRIEF DESCRIPTION OF THE DRAWINGS

FIGS. 2(a) and 2(b) are views showing structures of a reflecting sheet and an electrically conductive sheet in FIG. 1, in which FIG. 2(a) is a plan view and FIG. 2(b) is a cross-sectional view taken along line b—b' in FIG. 2(a);

BEST MODE FOR CARRYING OUT THE INVENTION

Hereinafter, embodiments of the present invention will be described with reference to the drawings.

(First Embodiment)

Figure 1:
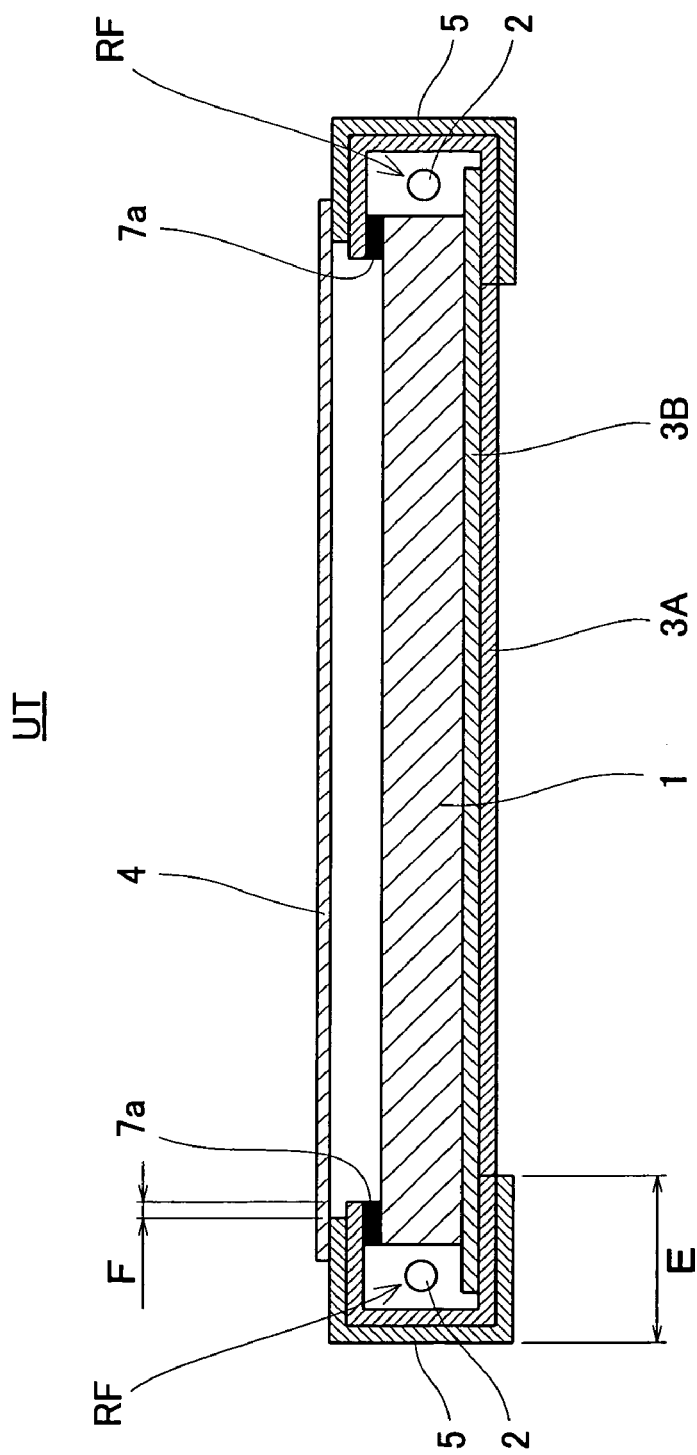
FIG. 1 is a cross-sectional view schematically showing a structure of a lighting unit according to a first embodiment of the present invention.

FIG. 1 is a cross-sectional view schematically showing a structure of a lighting unit according to a first embodiment of the present invention. As shown in FIG. 1, a lighting unit UT comprises as main components, a light guiding plate 1, fluorescent discharge tubes 2 as light sources, reflecting sheets 3A and 3B, and electrically conductive sheets 5. Herein, as described below, the second reflecting sheet 3A is a hold sheet for holding a reflecting sheet, configured to hold the first reflecting sheet 3B.

The light guiding plate 1 is a flat transparent plate, and is made of a material having necessary or optimal optical characteristics, such as transmissivity and a refractive index or the like required for transmitting light, for example, acrylic. The light guiding plate 1 is provided with, for example, a dot pattern or a groove pattern (not shown) on a bottom surface thereof, which varies its shape according to a distance from the fluorescent discharge tubes 2, for diffusing light entering the light guiding plate 1 from the fluorescent discharge tubes 2. The fluorescent discharge tubes 2 are bar-type (straight tube type) and disposed on a pair of opposed end faces of the light guiding plate 1.

The first reflecting sheet 3B having an area larger than that of the bottom surface of the light guiding plate 1 is disposed on a rear surface (an opposite surface of a light emanating surface) of the light guiding plate 1. And, the first reflecting sheet 3B, the end face of the light guiding plate 1 on which the fluorescent discharge tube 2 is not disposed, and a vicinity of the end faces of the light guiding plate 1 on which the fluorescent discharge tubes 2 are disposed (hereinafter, referred to as reflector portions RF) are continuously covered with the second reflecting sheet 3A. In each of the reflector portions RF, an end portion of the second reflecting sheet 3A which is bent in U-shape so as to enclose the fluorescent discharge tube 2 is fixed to a front surface (the light emanating surface) of the light guiding plate 1 by an adhesive 7a such as a double face adhesive tape. The first reflecting sheet 3B disposed between the light guiding plate 1 and the second reflecting sheet 3A is not bonded or fixed to the light guiding plate 1, and to the second reflecting sheet 3A. Instead, the sheet 3B is interposed and held between the light guiding plate 1 and the second reflecting sheet 3A. It is preferred that an area of the entire first reflecting sheet 3B thus interposed is set to be larger than that of the rear surface of the light guiding plate 1 as described above, or both end portions of the first reflecting sheet 3B are extended, so as to inhibit the reflecting sheet 3B from being displaced and thereby protruded outside from the bottom surface of the light guiding plate 1.

The first and second reflecting sheets 3B and 3A are formed by white resinous films having a high reflectivity, for example. Herein, thickness of each of the first and second reflecting sheets 3B and 3A is set to 188 μm. The first reflecting sheet 3B may have a single-layer or multi-layer structure, but in the multi-layer structure, the thickness of the entire first reflecting sheet 3B might be large. Accordingly, the first reflecting sheet 3B has the single-layer structure.

Figure 2A:
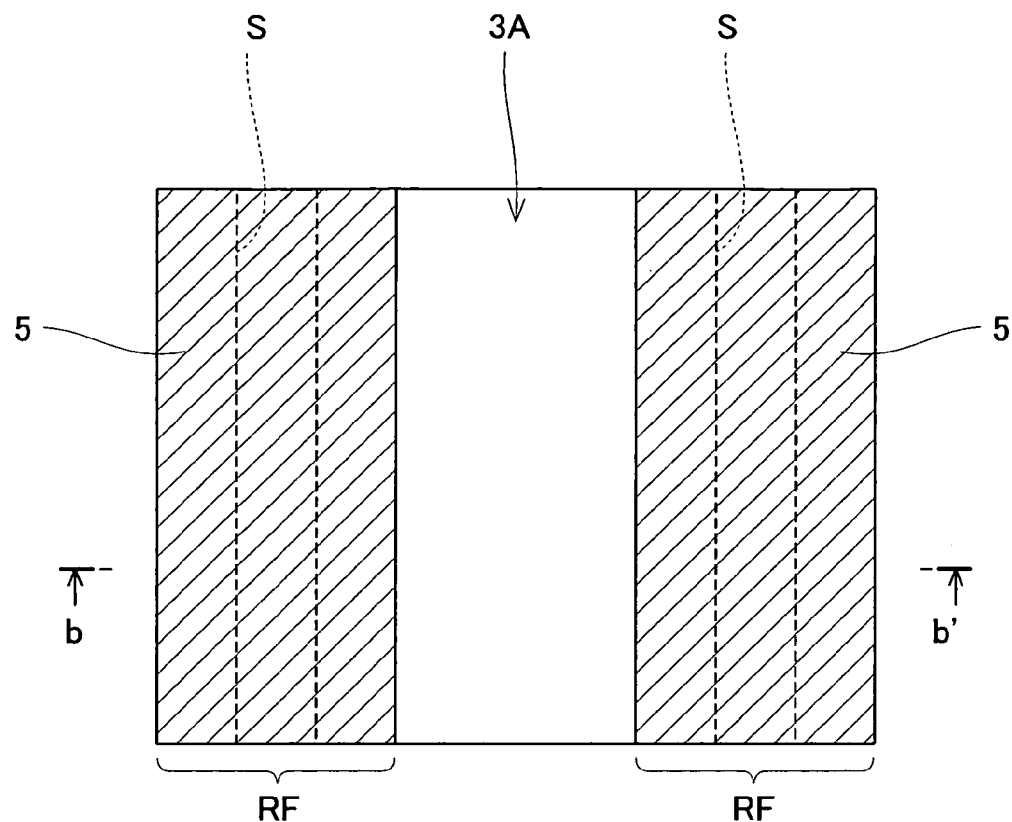
Figure 2B:
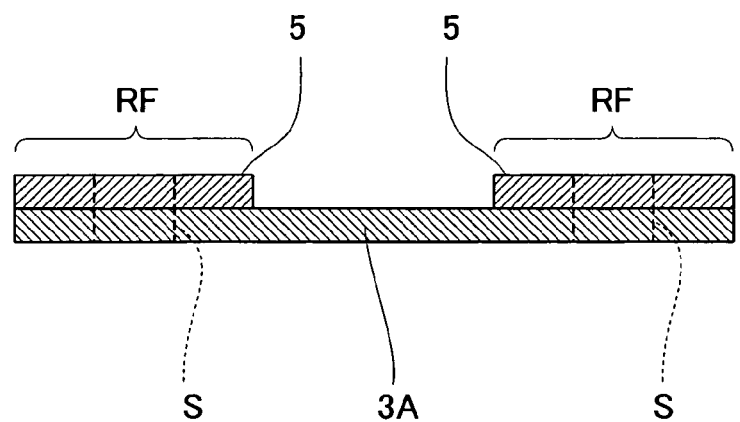

The electrically conductive sheets 5 are disposed so as to cover an outer surface of the second reflecting sheet 3A corresponding to the reflector portions RF, for blocking an electromagnetic wave radiated from the fluorescent discharge tubes 2, and for inhibiting the electromagnetic wave from leaking out of the unit. The electrically conductive sheet 5 is made of an electrically conductive material such as copper foil or aluminum foil. As shown in FIGS. 2(a) and 2(b), the electrically conductive sheets 5 are bonded and fixed to a surface of predetermined regions of the second reflecting sheet 3A in advance by an adhesive (not shown). The second reflecting sheet 3A to which the electrically conductive sheets 5 are bonded is provided with fold lines S (broken lines in FIGS. 2(a) and 2(b)) in predetermined portions so that the sheet 3 is folded so as to correspond to the above-described regions to be covered. By folding the second reflecting sheet 3A and the electrically conductive sheets 5 along the fold lines S, the second reflecting sheet 3A and the electrically conductive sheets 5 form a shape of the reflector portions RF which cover the fluorescent discharge tubes 2, i. e., the shape in which the second reflecting sheet 3A and the electrically conductive sheets 5 enclose the fluorescent discharge tubes 2 in a U-shaped cross-section. As shown in FIG. 1, length E of an end portion of the electrically conductive sheet 5 on the rear surface side of the light guiding plate 1 is set to 5 to 25 mm. And, a distance F between the end portion of the electrically conductive sheet 5 and an end portion of the second reflecting sheet 3A on the front surface side of the light guiding plate 1, is set to 0.2 mm or larger, for inhibiting the electrically conductive sheet 5 from shining due to reflection when the lighting unit UT is seen from the light emanating surface side.

Figure 3:
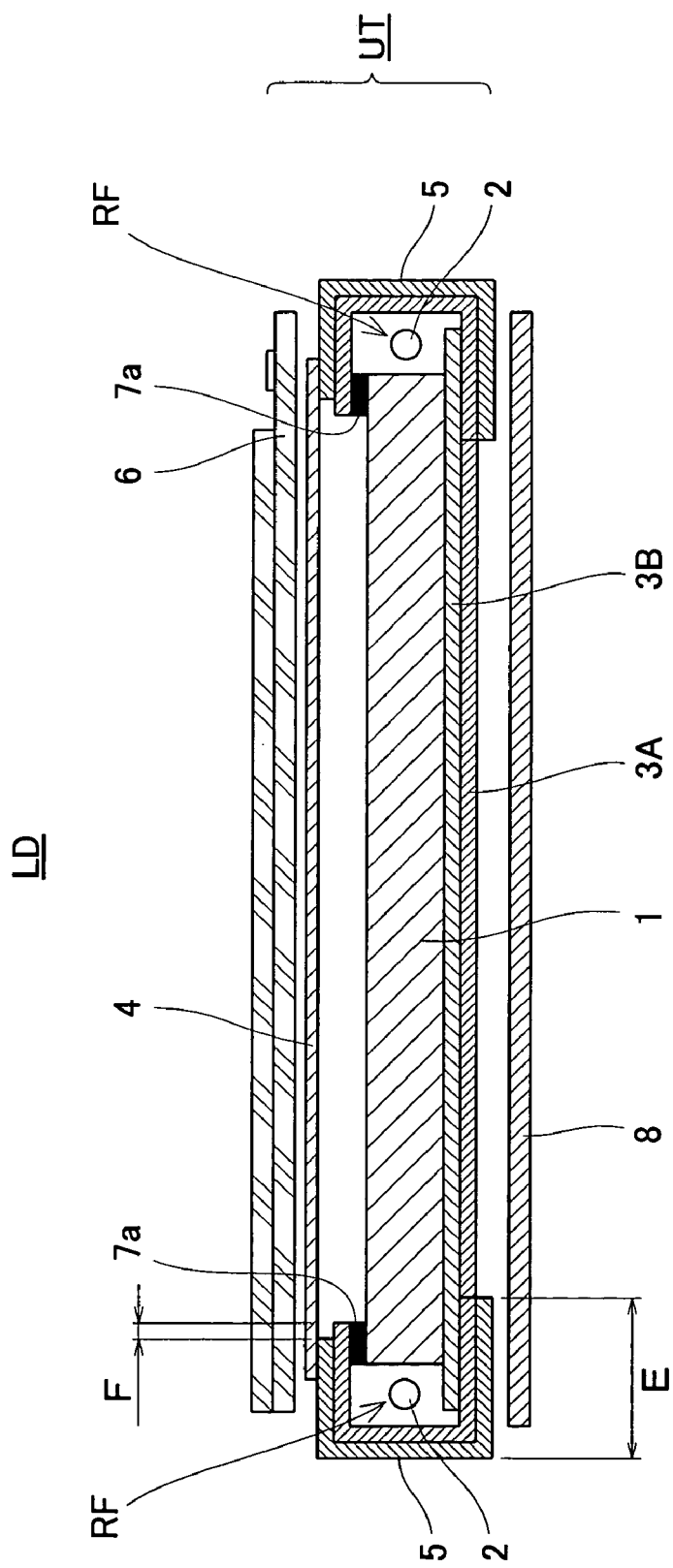
FIG. 3 is a cross-sectional view schematically showing a structure of a liquid crystal display device according to the present invention comprising the lighting unit in FIG. 1.

A light correction sheet 4 formed by a diffusion sheet, a prism sheet or the like is further disposed on the light emanating surface side of the light guiding plate 1, and thus, the lighting unit UT is structured. FIG. 3 is a cross-sectional view schematically showing a structure of a liquid crystal display device according to the present invention comprising the above-described lighting unit UT. As shown in FIG. 3, a liquid crystal display device LD is structured in a way that a liquid crystal panel 6 is disposed on the light emanating surface side of the above-structured lighting unit UT, and a circuit board 8 provided with a drive circuit for driving the lighting unit UT and the liquid crystal panel 6 is disposed on the rear surface side of the light guiding plate 1.

When the lighting unit UT and the liquid crystal display device LD structured as described above are operating, a high-frequency alternating current of 40 to 100 kHz is applied to the fluorescent discharge tubes 2. Thereby, a high voltage is applied to the fluorescent discharge tubes 2, which emit light. Herein, while emitting light, the fluorescent discharge tubes 2 radiate the electromagnetic wave. However, since the electrically conductive sheets 5 capable of blocking the electromagnetic wave are disposed on the reflector portions RF of the lighting unit UT, the electromagnetic wave radiated from the fluorescent discharge tubes 2 is blocked by the electrically conductive sheets 5. Therefore, the electromagnetic wave does not leak out of the lighting unit UT and hence does not negatively affect the liquid crystal panel 6 and the circuit board 8. As a result, the liquid crystal display device LD with a high reliability can be obtained, by inhibiting occurrence of noise or Moire fringes on the display screen.

The light emitted from the fluorescent discharge tubes 2 enters the light guiding plate 1 from the end faces thereof on which the fluorescent discharge tubes 2 are disposed, passes through an inside of the light guiding plate 1, and emanates from the emanating surface thereof. The light leaking out of the light guiding plate 1 and the fluorescent discharge tubes 2 is reflected by the first and second reflecting sheets 3B and 3A, and is guided into the light guiding plate 1. The reflection by the reflecting sheets 3A and 3B allows an amount of light emanating from the light guiding plate 1 to increase, thereby improving a luminance thereof. Especially, herein, since two reflecting sheets are disposed, reflectivity of the entire first and second reflecting sheets 3B and 3A becomes higher as compared to a case where one reflecting sheet is provided. Therefore, it is possible to further increase the amount of emanating light, and to thereby further improve the luminance thereof.

The light emanating from the light guiding plate 1 is diffused and collected by the light correction sheet 4. By this correction, uniform and highly luminous light can be obtained. The light that has penetrated the light correction sheet 4 enters the liquid crystal panel 6 disposed above. In the liquid crystal panel 6, display is performed by using the light.

In the lighting unit UT and the liquid crystal display device LD in this embodiment, since thermal expansion coefficients and water absorption coefficients of the light guiding plate 1, the first and second reflecting sheets 3A and 3B, and the electrically conductive sheet 5 differ from one another, a difference occurs in an amount of expansion or contraction among these components, thereby resulting in a difference of expansion or contraction among the components 1, 3A, 3B, and 5, when these components expand or contract due to a variation in humidity and temperature in the vicinity of the lighting unit UT. Herein, however, since the first reflecting sheet 3B is not fixed to the light guiding plate 1, to the second reflecting sheet 3A, and to the electrically conductive sheet 5, the first reflecting sheet 3B is not restricted by tensile stress or compressive stress from the light guiding plate 1, the second reflecting sheet 3A, or the electrically conductive sheet 5, so that the sheet 3B expands or contracts freely. Therefore, deflection or crease does not occur in the first reflecting sheet 3B. On the other hand, since the second reflecting sheet 3A is bonded and fixed to the electrically conductive sheet 5 and to the light guiding plate 1, the second reflecting sheet 3A can not expand or contract freely due to restriction by the tensile stress or the compressive stress from the light guiding plate 1 and the electrically conductive sheet 5. Thus, deflection or crease occurs in the second reflecting sheet 3A due to the difference between the amount of expansion or contraction of the light guiding plate 1 or the electrically conductive sheet 5 and that of the reflecting sheet 3A. However, in the lighting unit UT, it is the first reflecting sheet 3B that directly reflects the light leaking out of the light guiding plate 1. So, even deflection or crease occurring in the second reflecting sheet 3A does not bring about non-uniform luminance, and therefore, does not affect uniformity of the illuminating light of the lighting unit UT. Therefore, the highly luminous lighting unit UT with highly uniform light is realized in this embodiment.

In this embodiment, since the thickness of the lighting unit UT does not increase, unlike in the case where the reflecting sheet is formed by a metal plate or the like, a thin, light, and small unit capable of obtaining uniform luminance is realized. Also, a low-cost lighting unit with a simple structure is achieved. And, since occurrence of deflection or crease is inhibited without using the adhesive such as the double face adhesive tape, there is no possibility that the non-uniform luminance occurs due to reflection of light by the adhesive. In the reflector portions RF, the second reflecting sheet 3A is bonded and fixed to the light emanating surface of the light guiding plate 1 by the adhesive, but there is no problem since the portion on which the first reflecting sheet 3A is bonded and fixed hardly affects the uniform luminance of the light emitting surface of the lighting unit UT.

Since two reflecting sheets 3A and 3B are disposed on the rear surface side of the light guiding plate 1, it is possible to reflect the light leaking out of the rear surface of the light guiding plate 1 with a high reflectivity, thereby returning the light into the light guiding plate 1 more efficiently than in the conventional case where one reflecting sheet is provided. So, the luminance of the light emitting surface of the lighting unit UT increases. For example, by using the lighting unit UT comprising a 7-inch class light guiding plate 1 used in a car navigation system and the like and provided with two reflecting sheets, it has been confirmed that the luminance of a center portion of the light emitting surface of the lighting unit UT increases approximately 5% as compared to a case where one reflecting sheet is provided.

Furthermore, when two reflecting sheets 3A and 3B are disposed as in this embodiment, it becomes possible to inhibit transmission of heat from the fluorescent discharge tubes 2 to the electrically conductive sheets 5, and to inhibit the heat of the fluorescent discharge tubes 2 from being deprived by the electrically conductive sheets 5, as compared to the case when one reflecting sheet is provided. So, deterioration of a luminance rising characteristic of the lighting unit UT due to the above-described transmission of heat when the lighting unit UT starts to be lighted under low-temperature environment, can be inhibited and the above-described characteristic can be improved. Especially, when the first reflecting sheet 3B has a thermal conductivity coefficient lower than that of the second reflecting sheet 3A, it is possible to inhibit the transmission of heat to the electrically conductive sheets 5 more effectively. Therefore, the luminance rising characteristic under low-temperature environment is further improved. Assuming that the first and second reflecting sheets 3B and 3A are made of the same material and have the same thickness, the thermal conductivity coefficients of the sheets 3A and 3B are different from each other, if lengths or shapes of the sheets are different from each other. So, in this case also, it is possible to improve the luminance rising characteristic by inhibiting the transmission of heat to the electrically conductive sheets 5 effectively.

As described above, the thin, light, small, low-cost and highly reliable lighting unit and the liquid crystal display device which are capable of achieving more uniform and higher luminance than those in the prior art example can be provided in this embodiment.

(Second Embodiment)

Figure 4:
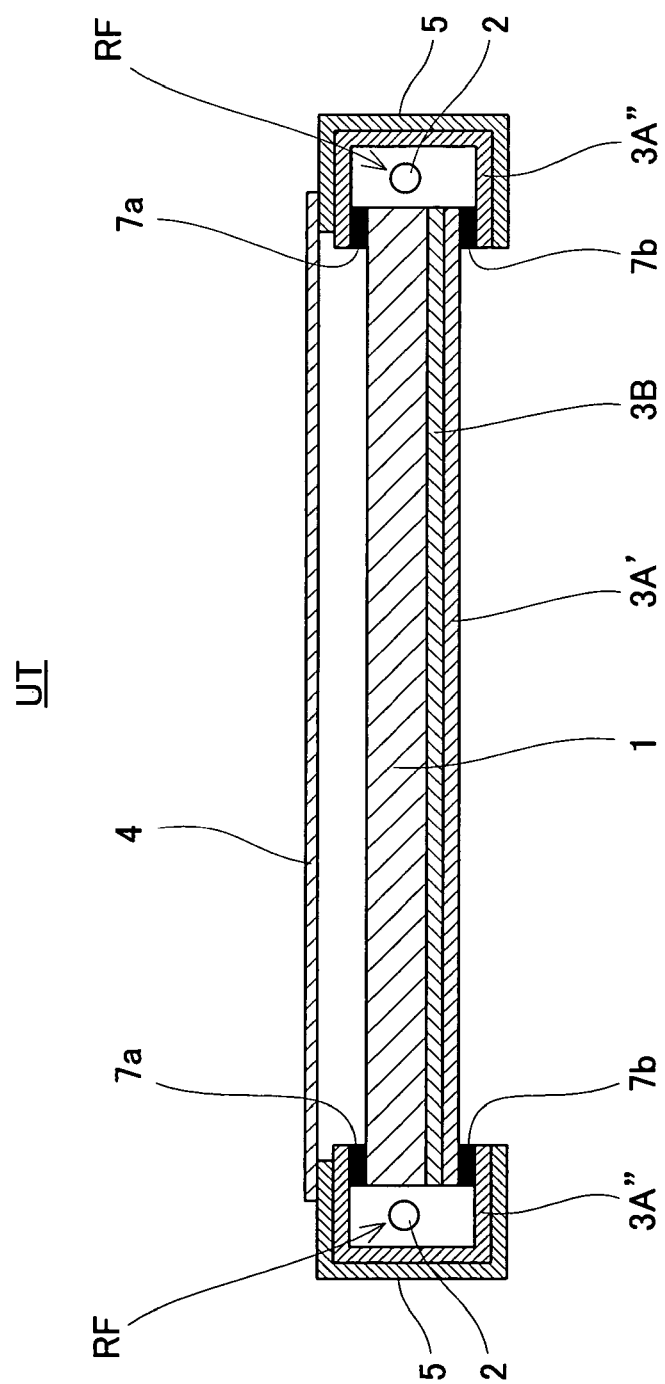
FIG. 4 is a cross-sectional view schematically showing a structure of a lighting unit according to a second embodiment of the present invention.
Figure 5:
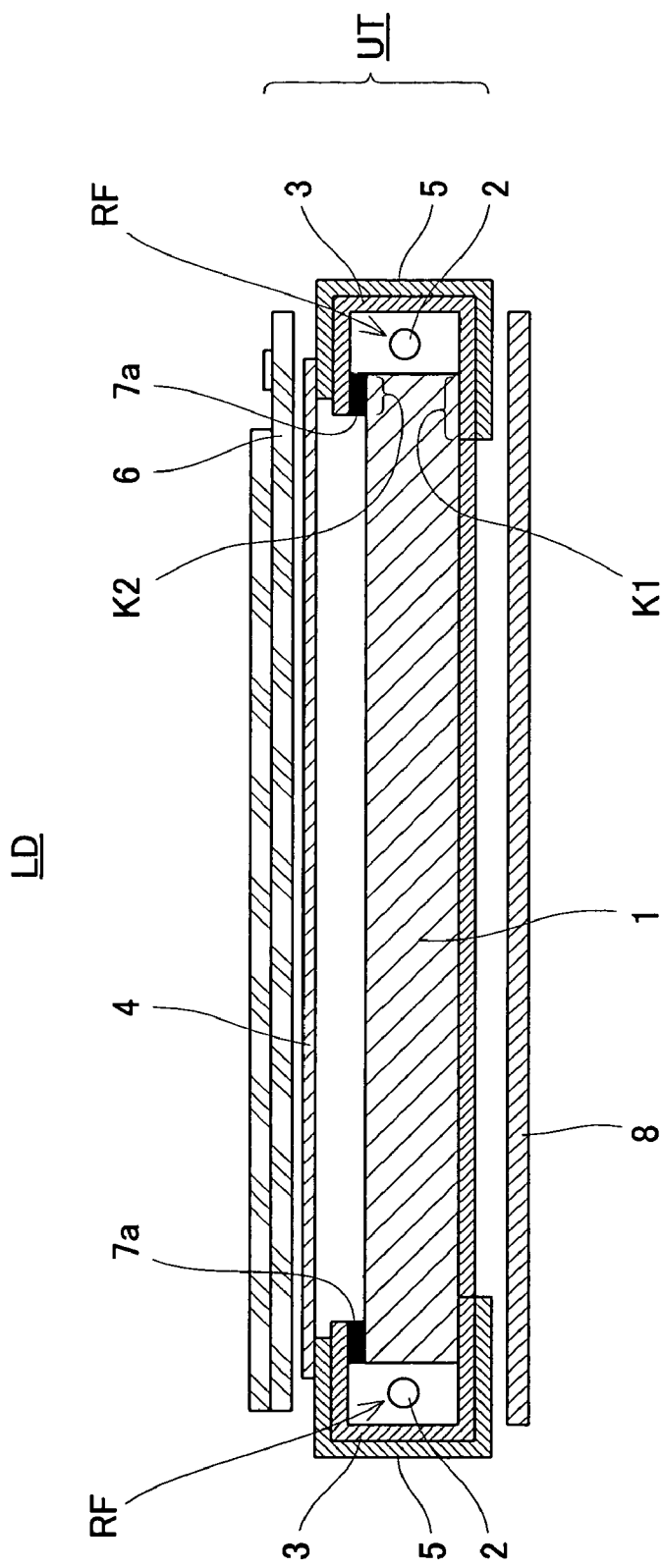
FIG. 5 is a cross-sectional view schematically showing a structure of the conventional lighting unit.
Figure 6:
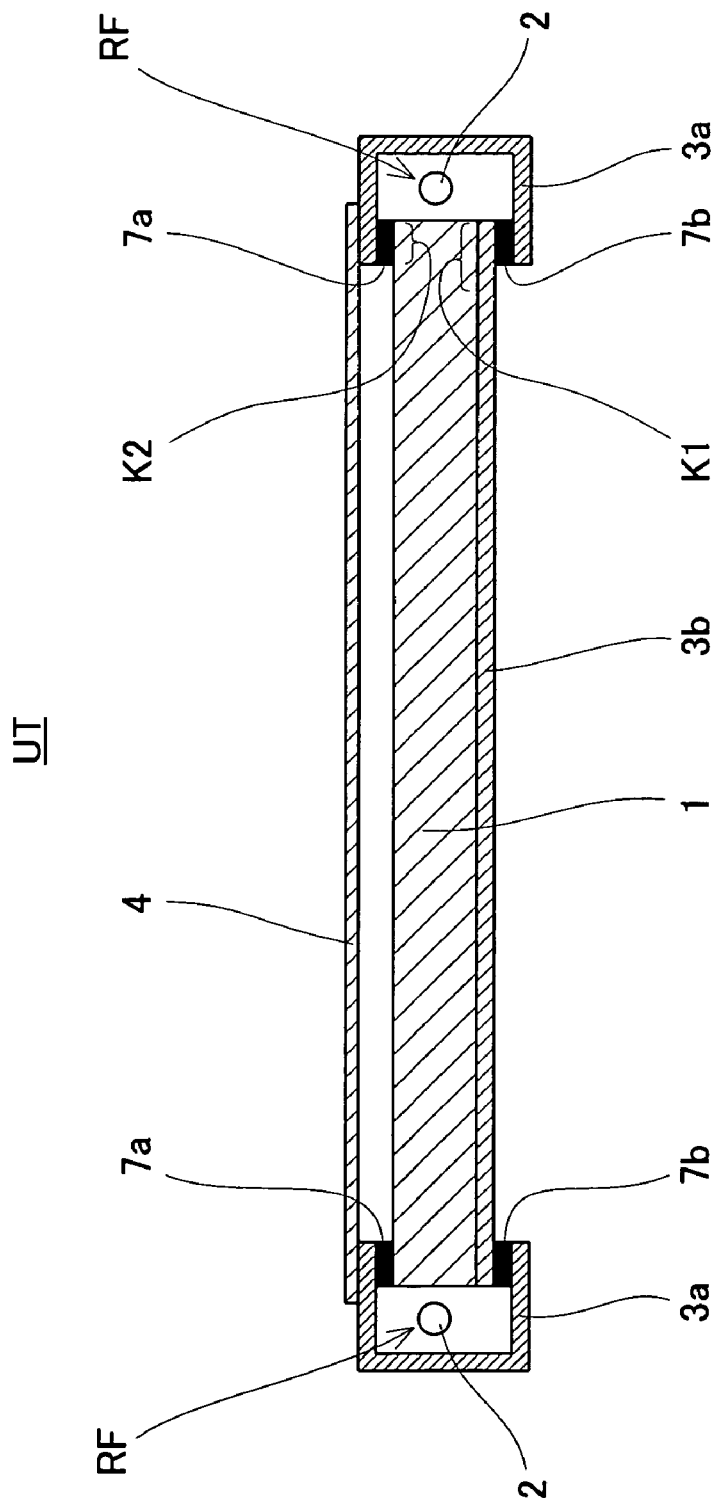
FIG. 6 is a cross-sectional view schematically showing another structure of the conventional lighting unit.

FIG. 4 is a cross-sectional view schematically showing a structure of a lighting unit according to a second embodiment of the present invention. As shown in FIG. 4, a structure of a lighting unit UT of this embodiment is identical to that of the lighting unit UT in the first embodiment except that a second reflecting sheet of this embodiment is separated into portions 3A" covering reflector portions RF and a portion 3A' covering a rear surface of a light guiding plate 1, and these sheets are bonded to one another by an adhesive 7b such as a double face adhesive tape. In this embodiment thus structured, the same effect as in the first embodiment is obtained. In a liquid crystal display device comprising the lighting unit UT of this embodiment, also, the same effect as in the liquid crystal display device LD in the first embodiment is obtained. When an integral-type second reflecting sheet 3A is disposed as in the first embodiment, a thin lighting unit UT, a cost reduction thereof, and a reduction of the number of assembly processes thereof are advantageously realized.

Although in the first and second embodiments, a case where the two straight tube type fluorescent discharge tubes are disposed has been described, the number, placement, and a kind of the fluorescent discharge tubes are not intended to be limited to these. The number of the tubes may be one or three or more, and an L-shaped or a U-shaped fluorescent discharge tube may be used. The present invention is applicable to any other edge light types having the above-described fundamental structure, and is also applicable to lighting units other than the edge light type. More particularly, the present invention is effective in the lighting unit required to be thin and small.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention. For example, the first reflecting sheet 3B may be disposed so as to conform to an entire inner periphery of the second reflecting sheet 3A.

Although, in the first and second embodiments, the lighting unit UT on which the electrically conductive sheets 5 are disposed has been described, the unit may have a structure in which the sheet 5 is omitted. In this case, an electromagnetic wave radiated from the fluorescent discharge tubes 2 is not blocked, but occurrence of the non-uniform luminance can be inhibited as described above.

While the first reflecting sheet 3B is held by the second reflecting sheet 3A in the first and second embodiments, the first reflecting sheet 3B may be held by a hold sheet for holding a reflecting sheet formed by a component other than the reflecting sheet. It is preferred that the hold sheet for holding the reflecting sheet is formed by the reflecting sheet, because leakage of light out of the light guiding plate 1 is effectively inhibited, and a low-cost, thin, light, and small lighting unit with a simple structure is realized.

Furthermore, although a case where the lighting unit according to the present invention is applied to the liquid crystal display device has been described in the first and second embodiments, an application of the lighting unit is not intended to be limited to this.

INDUSTRIAL APPLICABILITY

A lighting unit according to the present invention is useful as a lighting unit used in a display device of an information device such as a notebook-type personal computer or of a video device such as a portable television. And, a liquid crystal display device according to the present invention is useful as a liquid crystal display device used in a display device of the information device such as the notebook-type personal computer or of the video device such as the portable television.

The invention claimed is:

1. A lighting unit comprising:
a light source;
a light guiding component for guiding light emitted from the light source to an object to be illuminated; and
a reflecting component configured to cover the light guiding component, wherein
the reflecting component comprises a reflecting sheet configured to cover a surface of the light guiding component, and a hold sheet for holding the whole reflecting sheet and
the reflecting sheet is interposed and held between the light guiding component and the hold sheet for holding the reflecting sheet such that the reflecting sheet is not fixed to the light guiding component and the hold sheet for holding the reflecting sheet.

2. The lighting unit according to claim 1, wherein at least a portion of the hold sheet for holding the reflecting sheet is fixed to the light guiding component.

3. The lighting unit according to claim 2, wherein at least a portion of the hold sheet for holding the reflecting sheet is fixed to a surface of the light guiding component.

4. The lighting unit according to claim 1, wherein the hold sheet for holding the reflecting sheet is formed by a reflecting sheet.

5. The lighting unit according to claim 1, wherein an electrically conductive sheet is disposed on a region of the hold sheet for holding the reflecting sheet which is configured to cover the light source, and configured to block an electromagnetic wave radiated from the light source.

6. The lighting unit according to claim 5, wherein
the light guiding component is a light guiding plate;
the light source is disposed along an end face of the light guiding plate;
the reflecting sheet covers at least a rear surface of the light guiding plate;
the hold sheet for holding the reflecting sheet covers the rear surface of the light guiding plate covered with the reflecting sheet, the light source, and the end face of the light guiding plate; and
the electrically conductive sheet is disposed on a surface of the hold sheet for holding the reflecting sheet.

7. A liquid crystal display device comprising:
a lighting unit according to claim 1;
a liquid crystal panel disposed on a light emanating surface side of the lighting unit; and
a drive unit for driving the lighting unit and the liquid crystal panel.

8. The liquid crystal display device according to claim 7 comprising the lighting unit according to claim 5.

9. The lighting unit according to claim 1, wherein the hold sheet is configured to cover the light source.

10. The lighting unit according to claim 1, wherein the hold sheet is configured to have a thermal conductivity coefficient lower than that of the reflecting sheet.

* * * * *